United States Patent
Cai et al.

(10) Patent No.: US 8,320,287 B2
(45) Date of Patent: Nov. 27, 2012

(54) METHOD AND SYSTEM FOR THE INDICATION OF LONG DRX IN A WIRELESS NETWORK

(75) Inventors: Zhijun Cai, Euless, TX (US); Gordon Peter Young, Slough (GB); James Earl Womack, Bedford, TX (US); Takashi Suzuki, Tokyo (JP)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/407,958

(22) Filed: Mar. 20, 2009

(65) Prior Publication Data

US 2009/0238098 A1 Sep. 24, 2009

Related U.S. Application Data

(60) Provisional application No. 61/038,432, filed on Mar. 21, 2008.

(51) Int. Cl.
*H04B 7/00* (2006.01)
*G08C 17/00* (2006.01)

(52) U.S. Cl. .......................... 370/311; 370/310
(58) Field of Classification Search ............... 370/311, 370/310; 455/574
See application file for complete search history.

(56) References Cited

U.S. PATENT DOCUMENTS

| | | | |
|---|---|---|---|
| 2004/0100940 A1* | 5/2004 | Kuure et al. | 370/349 |
| 2007/0168826 A1* | 7/2007 | Terry et al. | 714/748 |
| 2008/0181127 A1* | 7/2008 | Terry et al. | 370/252 |
| 2008/0186892 A1* | 8/2008 | Damnjanovic | 370/311 |
| 2009/0232054 A1* | 9/2009 | Wang et al. | 370/328 |

FOREIGN PATENT DOCUMENTS

WO 2007148175 A1 12/2007

OTHER PUBLICATIONS

Ericsson, "Details of MAC DRX Control," TSG-RAN WG2 Meeting #61, Sorento, Italy, Feb. 11-15, 2008, (R2-080934), XP-002532356.
3GPP TS 36.321 v8.1.0 (Mar. 2008), "3rd Generation Partnership Project; Technical Specification Group Radio Access Network; Evolved Universal Terrestrial Radio Access (E-UTRA), Medium Access Control (MAC) protocol specification (Release 8)".
Research in Motion Limited, "Go to Long Sleep Command for LTE DRX," 3GPP TSG-RAN-WG2 Meeting #61bis, Shenzhan, China, Mar. 31-Apr. 4, 2008 (R2-081868), XP-002532357.
PCT/US2009/037760, International Search Report dated Jul. 2, 2009.
PCT/US2009/037760, Written Opinion dated Jul. 2, 2009.

(Continued)

*Primary Examiner* — Ayaz Sheikh
*Assistant Examiner* — Tarell Hampton
(74) *Attorney, Agent, or Firm* — Finnegan, Henderson, Farabow, Garrett & Dunner, LLP

(57) ABSTRACT

Methods and apparatus for configuring a discontinuous reception 'DRX' period at from an evolved Node B for a user equipment, including: sending a long DRX MAC CE from the eNB if preconditions are met, and at the UE determining whether a short DRX period is configured; if no, setting a long DRX period; if yes, determining whether a long DRX command was received in a medium access control 'MAC' control element; if yes, setting the long DRX period; if no, starting a short DRX timer and setting a short DRX period.

14 Claims, 14 Drawing Sheets

OTHER PUBLICATIONS

International Preliminary Report on Patentability for PCT/US2009/037760, dated Sep. 30, 2010 (11 pages).
Change Request, 3GPP TSG-RAN2 Meeting #62bis, Warsaw, Poland, Jun. 30-Jul. 4, 2008 (4 pages).
International Preliminary Report on Patentability for PCT/US2009/041769, dated Aug. 18, 2010 (14 pages).
Ericsson, Clarification of DRX, R2-083895, 3GPP TSG-RAN2 Meeting #62bis, Jul. 4, 2008, Warsaw, Poland (4 pages).

* cited by examiner

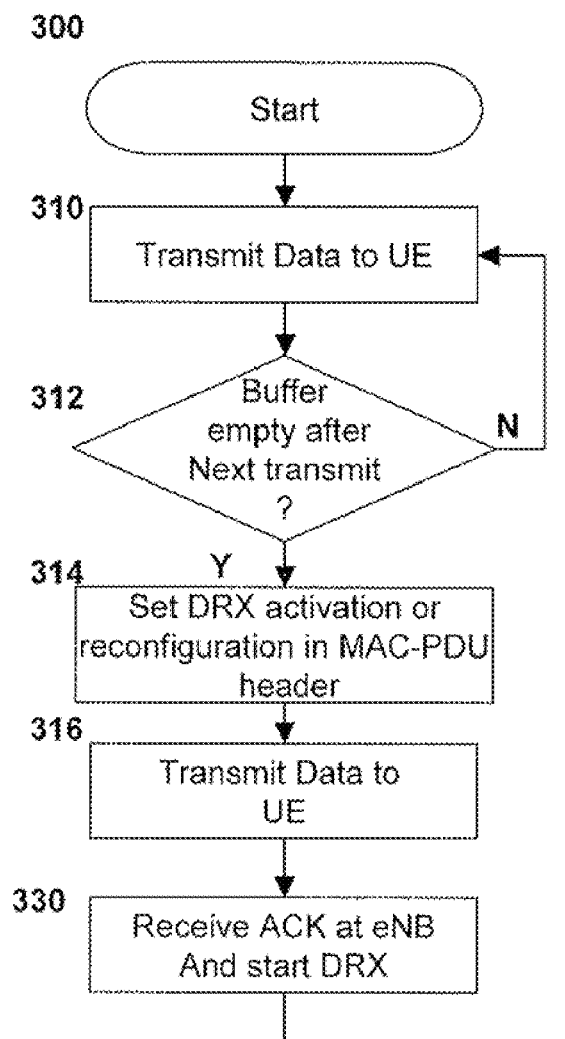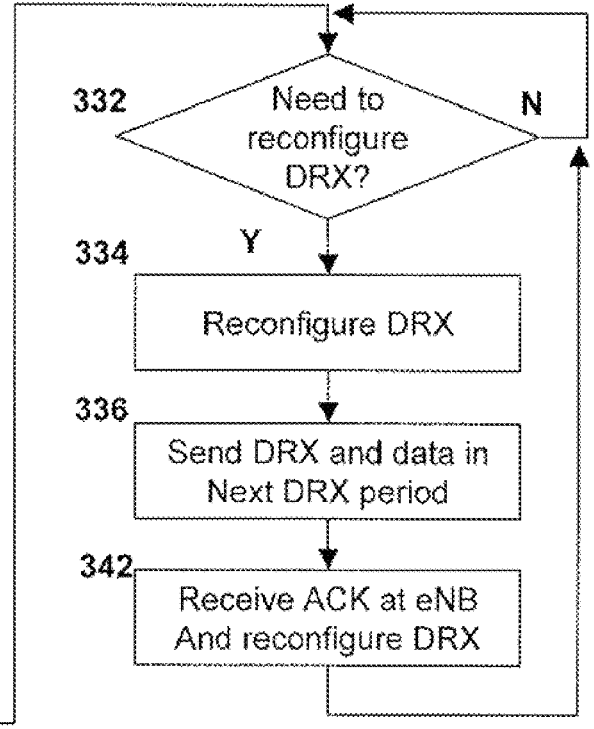
FIG 3a

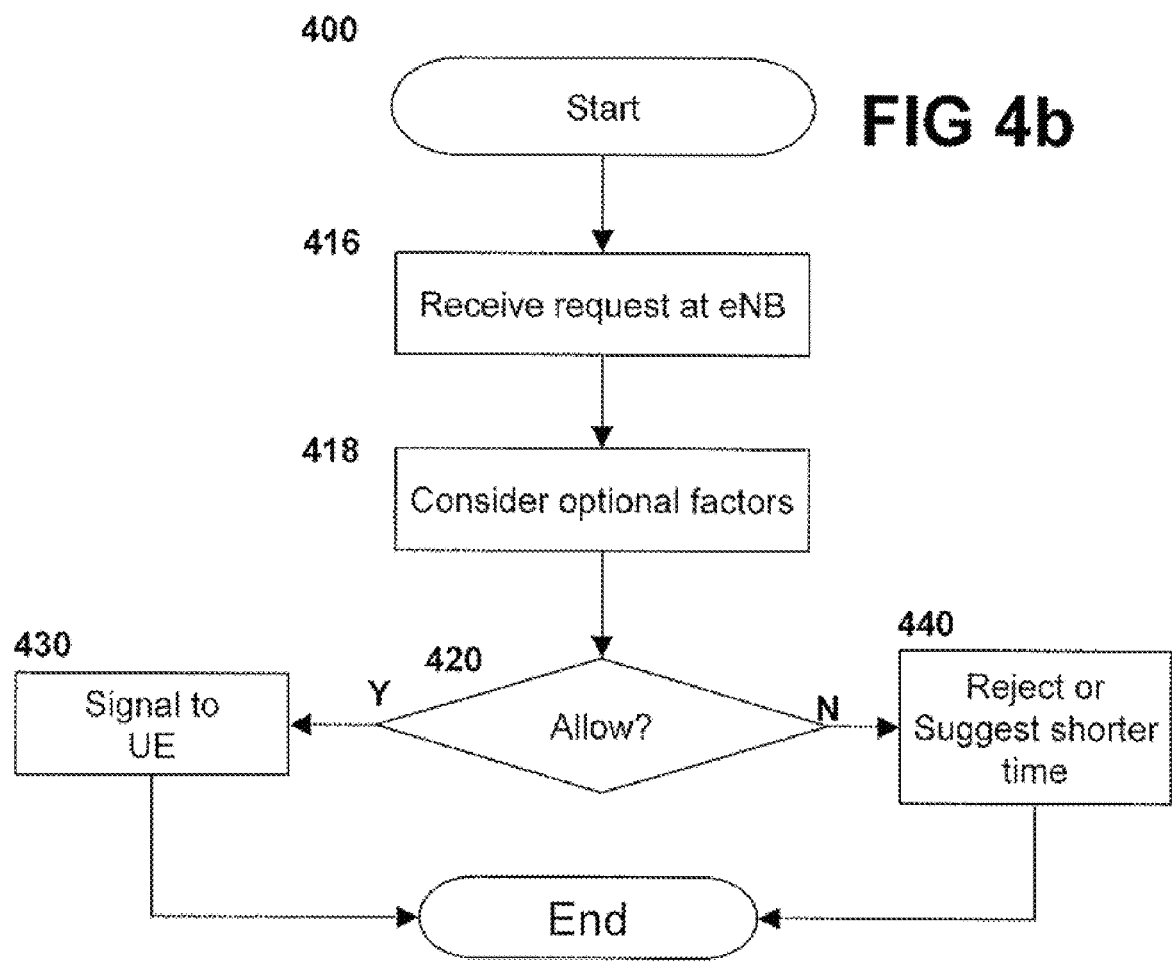

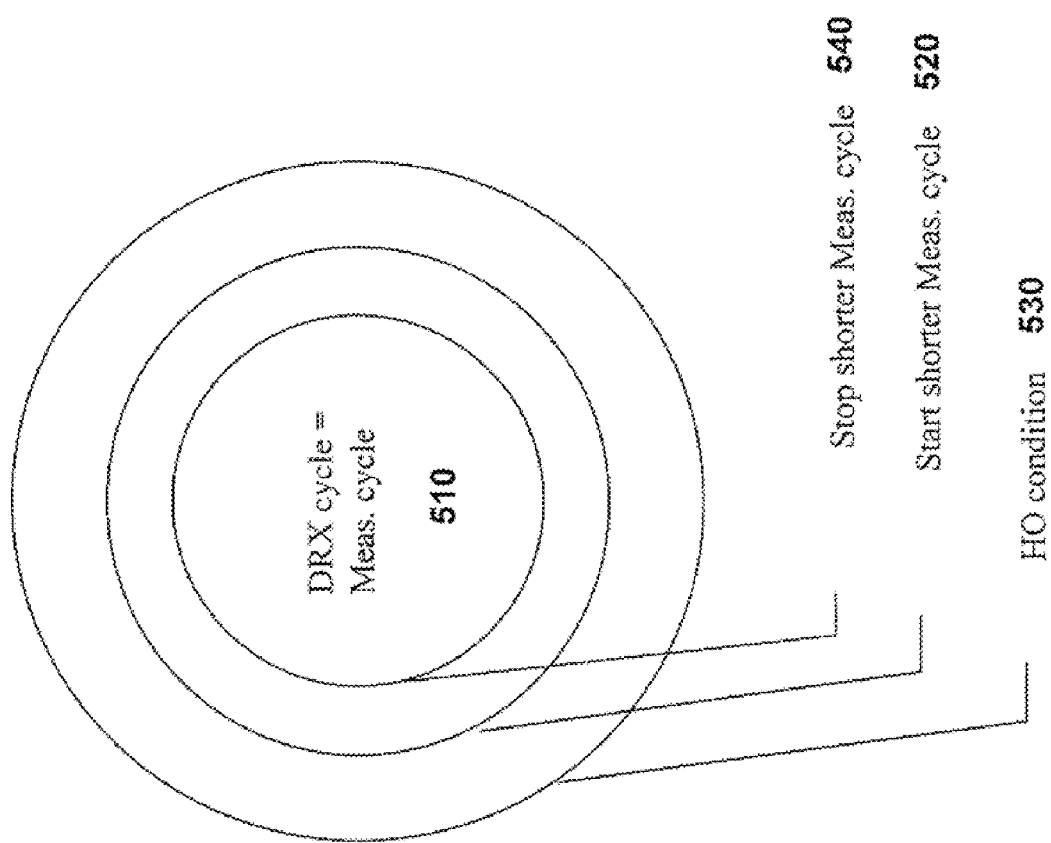

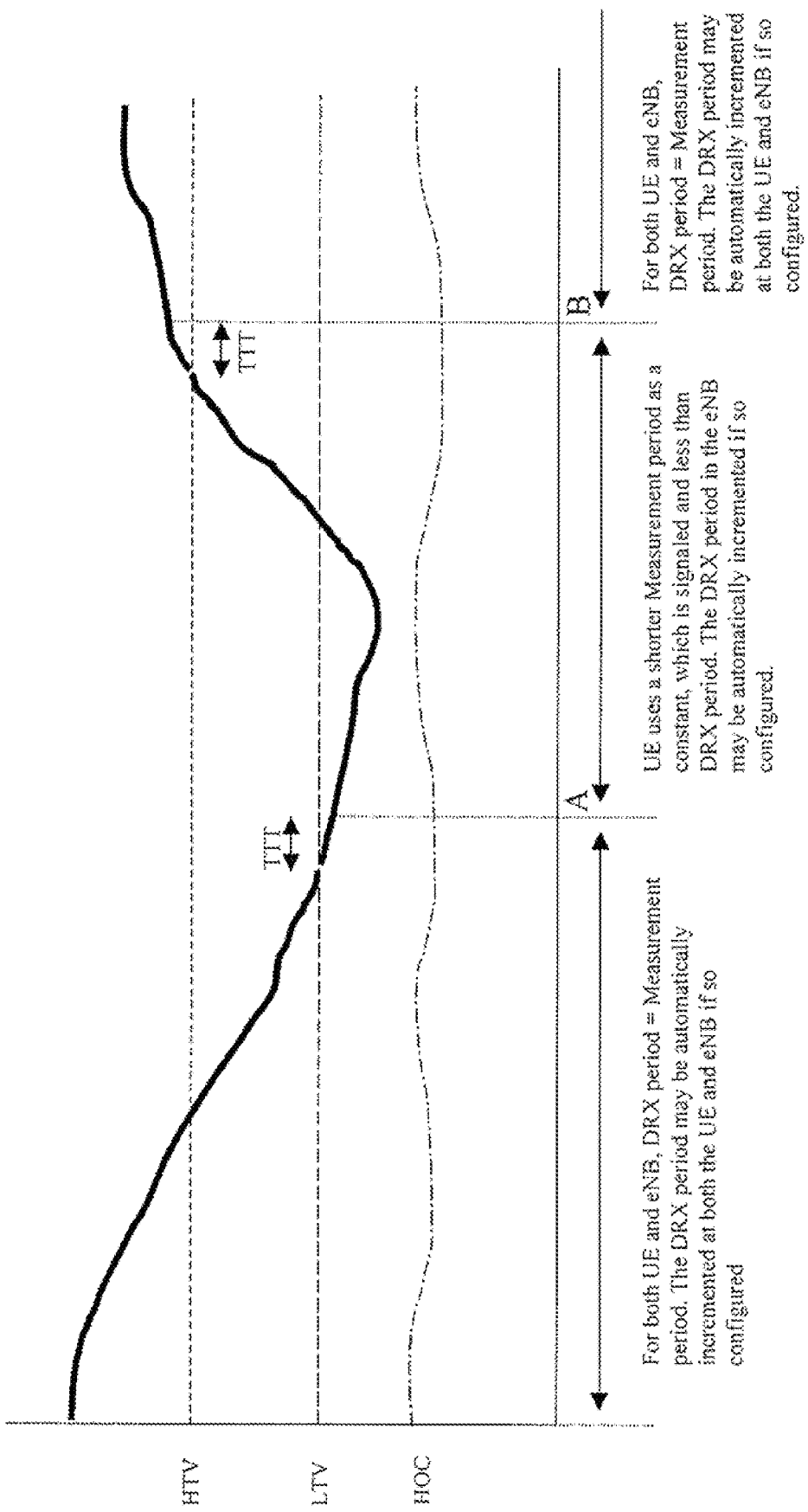

METHOD AND SYSTEM FOR THE INDICATION OF LONG DRX IN A WIRELESS NETWORK

CROSS-REFERENCE TO RELATED APPLICATION

The present application claims priority from U.S. Provisional Application Ser. No. 61/038,432, filed Mar. 21, 2008, the contents of which are incorporated herein by reference.

FIELD OF THE DISCLOSURE

The present disclosure relates to the long term evolution (E-UTRA) of Third Generation Partnership Project (3GPP), and in particular to discontinuous reception (DRX) for user equipment (UE) in the E-UTRA infrastructure.

BACKGROUND

In the long term evolution infrastructure, a UE can be in one of two radio resource control (RRC) states. These are LTE_IDLE and LTE_ACTIVE.

The UE can be configured for discontinuous reception (DRX) in both the LTE_IDLE and the LTE_ACTIVE states. DRX allows the UE to synchronize its listening period to a known paging cycle of the network. By synchronizing the listening period, the UE can turn off its radio transceiver during the standby, thereby significantly saving battery resources. As will be appreciated by those skilled in the art, unless a UE is used extensively, a large drain on its battery comes from the standby cycle in which it monitors the paging channel and measures serving and neighboring cells. DRX parameters allow the mobile to synchronize with the network and to know that it will not receive another signal until a specified time has elapsed.

Utilizing DRX in an IDLE state is performed in present UMTS systems and is done by the network signaling to the UE a DRX parameter and synchronizing the UE and the network. As will be appreciated, in IDLE mode the UE can change cells from one cell to the other. Thus utilizing a DRX parameter does not cause significant issues.

In an ACTIVE state however, various issues exist for turning off the receiver based on a DRX parameter. This includes the fact that only network controlled handover is allowed in the LTE_ACTIVE state. Also, other issues include efficient signaling of activation and deactivation of DRX, measurement requirements of network signals during the DRX, handling of missed handover opportunities, and issues dealing with the length of the DRX value in which entity in the network can request DRX activation and reconfiguring the DRX period.

In current systems, when short and long DRX is configured for non real time traffic and the traffic volume becomes very low, the eNB wants to put the UE which may be either in short DRX or actively listening to downlink common control channels into long DRX, for further battery saving if there is no uplink and downlink transmission. In current E-UTRA specifications, the eNB needs to deactivate short DRX using a RRC reconfiguration message at first and then issue a go-to-sleep MAC control element (CE). If traffic pattern changes, however, the eNB needs to activate short DRX by RRC again.

BRIEF DESCRIPTION OF THE DRAWINGS

The present application will be better understood with reference to the drawings, in which:

FIG. 3a is a flow chart showing a method to activate deactivate and reconfigure DRX period using a MAC-PDU header from the eNB side;

FIG. 4b is a flow chart showing a method for a UE to leverage application traffic characteristics to improve battery life from the eNB side;

FIG. 5 is a diagram showing signal strength thresholds and measurement cycle times;

FIG. 7 is a graph showing channel status going below a lower threshold value and then above a threshold value without any uplink data;

DETAILED DESCRIPTION OF THE DRAWINGS

Figure 1:
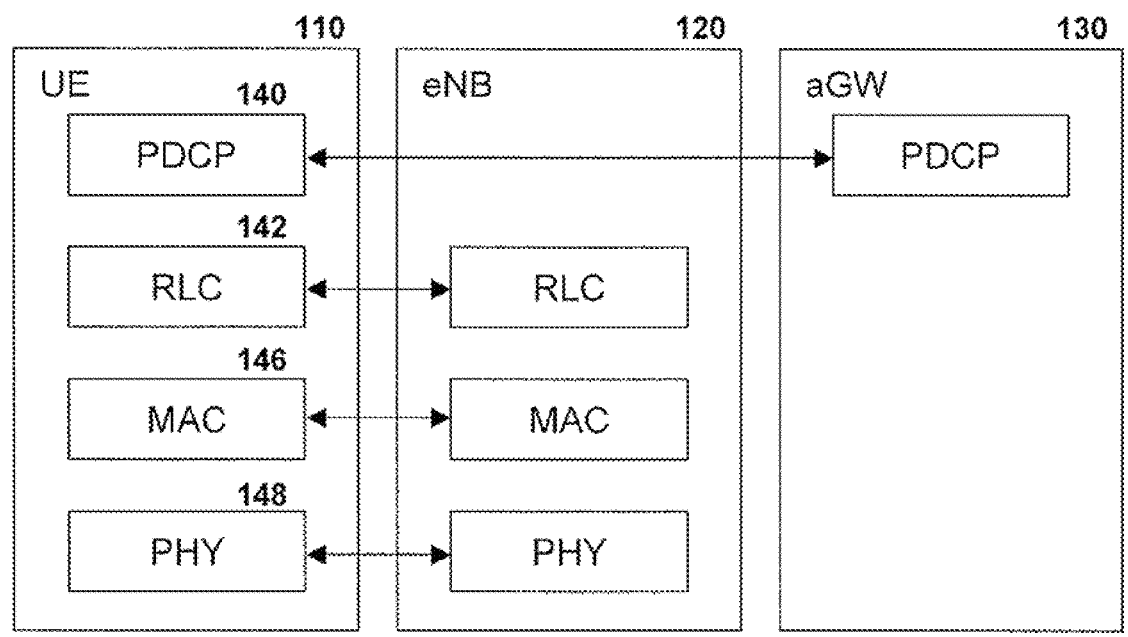
FIG. 1 is a block diagram showing a long term evolution user plane protocol stack.

The present disclosure provides various methods and systems for addressing the deficiencies in the prior art regarding DRX in an LTE_ACTIVE state.

In particular, a DRX signaling procedure between the UE and the eNB, in which the eNB signals DRX values and timing margins as part of a modified MAC-PDU header, is described. The eNB signaled DRX value can range from zero to indicate DRX deactivation to a value for the DRX period. The timing margin can indicate a delay for activating DRX to overcome NACK-ACK misinterpretations or ACK-NACK misinterpretations. In one embodiment the timing margin can be also signaled by the RRC.

In a further embodiment, the DRX value can be a relative value that is predefined on the eNB or the UE or a preconfigured value by RRC signaling. Thus a "short DRX value" could be used to indicate a short DRX period and a "long DRX value" could be used to indicate a long DRX period. In further embodiments, more than two values are possible. In this case, the eNB can signal, for example, a long DRX value in a "go-to-long-sleep" command to allow the UE to proceed directly to long DRX without having to transition first to a short DRX value and wait for the short DRX period timer to expire before transitioning to a long DRX period, and without RRC reconfiguration commands.

The DRX value, in one embodiment can be incrementally increased to a certain maximum value that will be either defined in the standards or signaled. The increment may be carried out without signaling by both the UE and the eNB if no data has been received for a preset number of DRX cycles.

In a further embodiment, the DRX value can be incrementally decremented until DRX is deactivated without signaling by both the UE and the eNB.

In a further embodiment, application level traffic characteristics can be leveraged for an optimization of the DRX period to improve battery life. The UE could, in this case, send a request to initiate or amend a DRX value to the eNB and the eNB can either accept this value or reject it. Various considerations including mobility, location of the cell, traffic characteristics, or missed handover opportunities can be determined for both the UE and the eNB in choosing and accepting a DRX value.

In a further embodiment, measurement accuracy may be improved by shortening the measurement cycle from the DRX cycle if a certain threshold signal value is reached for a certain amount of time. Thus, in the case of signal degradation, the UE may decide that more frequent measurement needs to be performed if the quality of the signal falls below a threshold for a predetermined time. Subsequently, the measurement cycle can be increased if the signal rises above a threshold for a certain time period, or a handover condition can be triggered if the signal falls below a threshold.

In a further embodiment, missed handover opportunities can be handled if the channel quality or signal strength of a serving cell is less than a neighboring cell by a threshold value for a certain duration. Procedures for switching to a target eNB are disclosed.

The present disclosure therefore provides a method of DRX signaling in a long-term evolution infrastructure between an evolved node B (eNB) and user equipment (UE), the method comprising the steps of: providing a DRX value or coded DRX value in a header of a medium access control protocol data unit (MAC-PDU); and activating, deactivating or reconfiguring DRX based on the provided DRX value.

The present disclosure further provides a method of leveraging application level traffic characteristics to improve battery life of user equipment (UE) communicating with an evolved Node B (eNB) comprising the steps of: requesting, from the UE, a discontinuous reception (DRX) based on application traffic characteristics of the UE; receiving the request from the UE at the eNB; and granting, negotiating an alternative period or rejecting the request at the eNB.

The present disclosure further provides a method for improved measurement accuracy during discontinuous reception (DRX) on user equipment (UE) comprising the steps of: checking whether a channel quality or signal strength of a serving cell is lower than a first threshold for a predetermined time period; and if yes, shortening the measurement cycle to have a shorter measurement cycle than the DRX cycle.

The present disclosure still further provides a method of handling missed handover opportunities based on discontinuous reception (DRX) in user equipment (UE) comprising the steps of: checking whether a channel quality or signal strength of a serving cell is less than the channel quality or signal strength of a neighboring cell by a threshold value for a certain time duration; and if yes, connecting to the neighboring cell.

The present disclosure further provides: an evolved node B (eNB) operating in a long-term evolution infrastructure, the eNB being characterized by means for providing a DRX value in a header of a medium access control protocol data unit (MAC-PDU); and activating or deactivating DRX based on the DRX value.

The present disclosure still further provides a user equipment (UE) operating in a long-term evolution (LTE) infrastructure, the UE being characterized by means for receiving a DRX value in a header of a medium access control protocol data unit (MAC-PDU) and acknowledging the MAC-PDU; and activating, deactivating or reconfiguring DRX based on the DRX value.

Reference is now made to the drawings. FIG. 1 shows a block diagram illustrating the long-term evolution (LTE) user plane protocol stack.

A UE 110 communicates with both an evolved Node B (eNB) 120 and an access gateway (aGW) 130.

Various layers are illustrated in the protocol stack. The packet data convergence protocol (PDCP) layer 140 is illustrated both on the UE 110 and on aGW 130. The PDCP layer 140 performs internet protocol (IP) header compression and decompression, encryption of user data, transfer of user data and maintenance of sequence numbers (SN) for radio bearers.

Below the PDCP layer 140 is the radio link control protocol layer 142, which communicates with the radio link control protocol layer 142 on the eNB 120. As will be appreciated, communication occurs through the physical layer in protocol stacks such as those illustrated in FIGS. 1 and 2. However, RLC-PDUs from the RLC layer 142 of the UE are interpreted by the RLC layer 142 on the eNB 120.

Below RLC layer 142 is the medium access control (MAC) data communication protocol layer 146. As will be appreciated by those skilled in the art, the RLC and MAC protocols form the data link sublayers of the LTE radio interface and reside on the eNB in LTE and user equipment.

Figure 2:
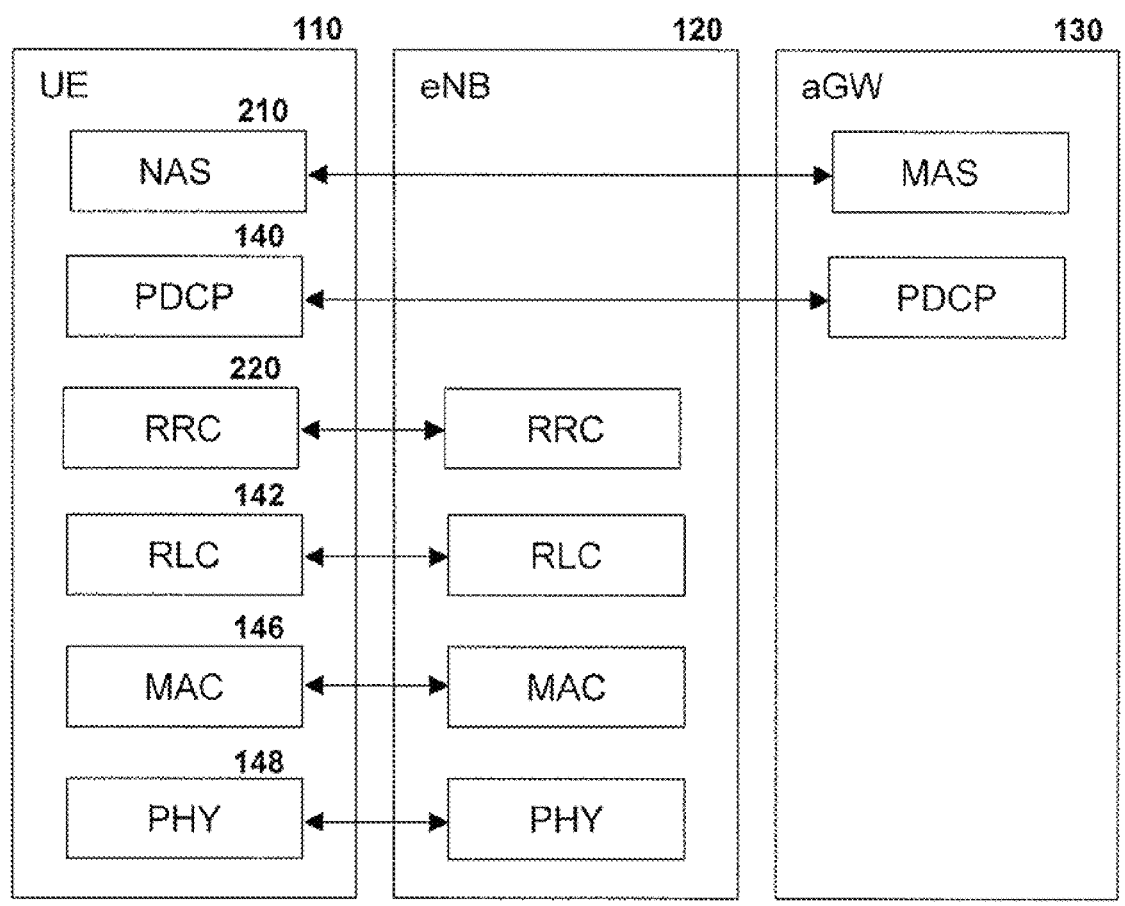
FIG. 2 is a block diagram showing a long term evolution control plane protocol architecture.

The layer 1 (L1) LTE (physical layer 148) is below the RLC/MAC layers 142 and 146. This layer is the physical layer for communications. Referring to FIG. 2, FIG. 2 illustrates the LTE control plane protocol architecture. Similar reference numerals to those used in FIG. 1 will be used in FIG. 2. Specifically, UE 110 communicates with eNB 120 and aGW 130. Further, physical layer 148, MAC layer 146, RLC layer 142 and PDCP layer 140 exist within FIG. 2.

FIG. 2 also shows the non-access stratum (NAS) layer 210. As will be appreciated, NAS layer 210 could include mobility management and session management.

The radio resource control protocol layer (RRC) 220, is the part of the protocol stack that is responsible for the assignment, configuration and release of radio resources between the UE and the E-UTRAN (Evolved universal terrestrial radio access network). The basic functionalities of RRC protocol for LTE is described in 3GPP TR25.813.

As will be appreciated by those skilled in the art, in UMTS, automatic repeat request (ARQ) functionality is carried out within the RLC layer which resides in the radio network controller (RNC). Long Term Evolution (LTE) moves the ARQ functionality from the RNC to eNB where a tighter interaction may exist between the ARQ and the HARQ (within the MAC layer, also located in the eNB).

Various issues regarding DRX in an LTE-ACTIVE state are considered herein.

DRX Signaling Procedure

Very efficient signaling procedures for activating and de-activating DRX and specifying the duration of DRX periods are required in order to support a large population of UEs in a cell that are utilizing DRX in an LTE_ACTIVE state.

As will be appreciated by those skilled in the art, if the evolved node B (eNB) transmits data to the UE during its receiver off period due to a DRX operation, the UE cannot receive the data. Therefore, an indication is required to ensure the UE and the eNB are synchronized regarding when DRX is activated and deactivated.

The indication between the UE and the eNB can be explicit signaling by the radio resource control (RRC) or layer 1/layer 2 (L1/L2) signaling. As will be appreciated, however, explicit signaling may not be as efficient as desired.

A more efficient solution is to include an optional field in the MAC header of a MAC-PDU (MAC Protocol Data Unit) to indicate DRX activation and deactivation. The field preferably indicates the DRX value and timing margin for activation and deactivation. A value of zero, for example, could mean DRX deactivation in the DRX value field in a preferred embodiment. Conversely, if data that is to be transmitted in the next MAC-PDU is the last one in the buffer for the UE, the eNB may extend the MAC header field to include a DRX length initial value. For example, this could be 320 milliseconds. The timing margin is explained below, and is utilized to reduce the consequences of a NACK to ACK or ACK to NACK misinterpretation, for the reception status of the MAC-PDU between the UE and the eNB.

For example, three bits may be added to the MAC header to indicate eight values of the DRX period. Thus, rather than a specific time value being sent, a bit value from 000 to 111 could indicate one of eight discrete values.

In an alternative, a smaller field in the MAC header could be used (for example two bits) to indicate increment or decrement. The RRC could indicate default values, and if the MAC header indicates increment or decrement then the UE could change to the prespecified value.

Once the UE receives the DRX value, it acknowledges it to the eNB by transmitting HARQ ACK and starts the DRX at the system frame time considering propagation delay and processing delay at the eNB. When the eNB receives the ACK from the UE, it also starts the DRX at the next system frame time. As will be appreciated, the eNB does not turn off its transceiver, but simply knows not to transmit messages to the individual UE.

During a DRX period, if new data arrives at the eNB, the eNB can send a MAC-PDU with a header extension set to DRX deactivation or a shorter DRX length depending on the amount of data in the buffer or the quality of service requirements. The UE reconfigures the DRX accordingly and acknowledges the MAC-PDU. When the eNB receives the ACK, it reconfigures the DRX. As indicated above, the deactivation could be accomplished by merely setting the length value to zero.

Figure 3B:
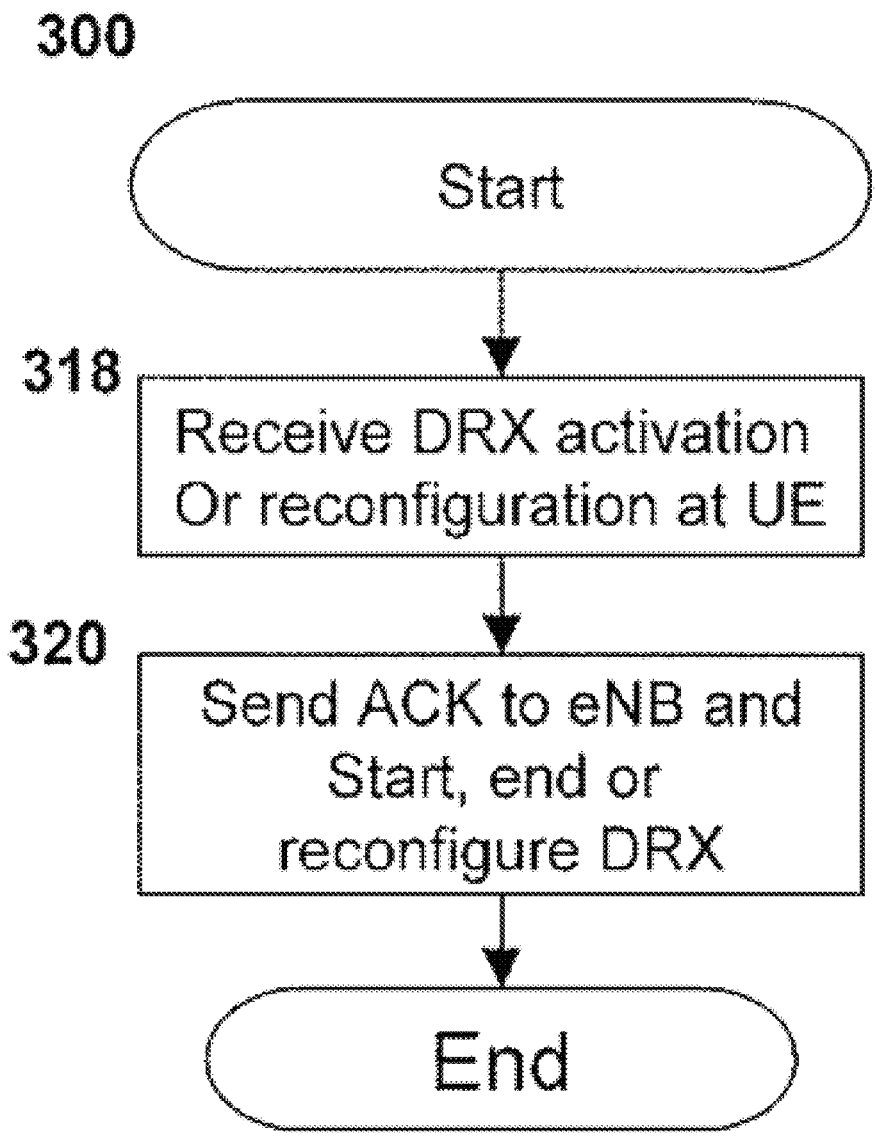
FIG. 3b is a flow chart showing a method to acknowledge the activation, deactivation or reconfiguration of the DRX period from the UE side.

Reference is now made to FIGS. 3a and 3b. FIG. 3a shows an exemplary method for controlling DRX activation in an LTE_ACTIVE state. The process starts at step 300 and proceeds to step 310 in which data is transmitted to the UE. As will be appreciated by those skilled in the art, data transmission in an LTE_ACTIVE state utilizes the MAC-PDU at the data link layer to transmit the data.

The process next proceeds to step 312 in which a check is made to see whether the buffer of data to be sent to the UE will be empty after the next transmit. If no, the process proceeds back to step 310 in which data is transmitted to the UE. Alternatively, if the buffer will be empty after the next transmit and the data arrival rate is lower than a threshold value, the process proceeds to step 314.

In step 314, the eNB sets DRX activation in the MAC-PDU header. As indicated above, this includes a DRX activation value indicating the length of the DRX period. In another embodiment the eNB may simply indicate an increase in the DRX interval. The UE reconfigures the existing DRX interval to a predetermined reduced interval. The predetermined interval may be either known to both eNB and UE or pre-signaled to the UE from the eNB via explicit signaling; either by system broadcast or RRC signaling.

The process then proceeds to step 316 in which the data including the modified MAC-PDU header is sent to the UE.

Reference is now made to FIG. 3b. In step 318, the UE receives the data and sees that DRX activation is specified in the MAC-PDU header. The process proceeds to step 320 in which the UE sends an acknowledgement (ACK) to the eNB and starts the DRX at the system frame time considering propagation delay and processing delay at the eNB.

In step 330 of FIG. 3a, the eNB receives the ACK from the UE and starts the DRX at the next system frame time.

As will be appreciated, the DRX can continue until various events occur which may require the DRX to be adjusted. One event is the reception of data from aGW by the eNB for the UE. Depending on the amount of data received, the DRX can either be deactivated or the period of the DRX can be reduced. Other events that may require the adjustment of the DRX include a change of signal power level between the eNB and the UE or possibly a gradual increase in the DRX cycle due to continued data inactivity, among others. These other events are discussed in more detail below.

In step 332 the eNB checks to see whether the DRX needs to be adjusted. As indicated above, this could be the situation where data is received to be sent to the UE. Here the DRX can either be deactivated or the period adjusted.

From step 332, if the DRX does not need to be adjusted, the process proceeds back to step 332 and continues to check whether or not the DRX needs to be adjusted.

Once the process in step 332 finds that the DRX does need to be adjusted, the process proceeds to step 334 in which it adjusts the DRX. This could be deactivating the DRX by transmitting a zero value for the DRX or a shorter DRX or a longer DRX as required.

The MAC-PDU with the modified header is sent to the UE in step 336. The MAC-PDU in step 336 could also include any data that has been received by the eNB that needs to be transmitted to the UE.

Referring to FIG. 3b, the process then proceeds to step 318 in which the MAC-PDU with modified header is received at the UE. The UE recognizes the DRX period is to be adjusted and in step 320 it sends an acknowledgement to the eNB and it adjusts its DRX period at the same system frame time considering propagation delay and processing delay as at the eNB.

Referring to FIG. 3a, in step 342 the eNB receives the ACK and starts the modified DRX period at the appropriate system frame time. The process then proceeds back to step 332 to see whether the DRX needs to be adjusted again.

In one embodiment, a DRX command MAC control element could indicate to a UE to transition to a DRX period. In this case, if the eNB wants the UE to transition to a long DRX period due to lack of uplink and downlink traffic and based on low traffic rates for non real time DRX, under current E-UTRA specifications this requires a change in the DRX configuration to be made with an RRC configuration message. A problem with this is that if the eNB later receives traffic patterns that require a shorter DRX period, the RRC configuration message will need to be sent again to reconfigure the DRX configuration on the UE.

Instead, a MAC CE could include a "go-to-long-sleep" possibility. Thus, the eNB could provide the UE with an option to go directly to a long DRX period without a reconfiguration message explicitly being sent.

Figure 10A:
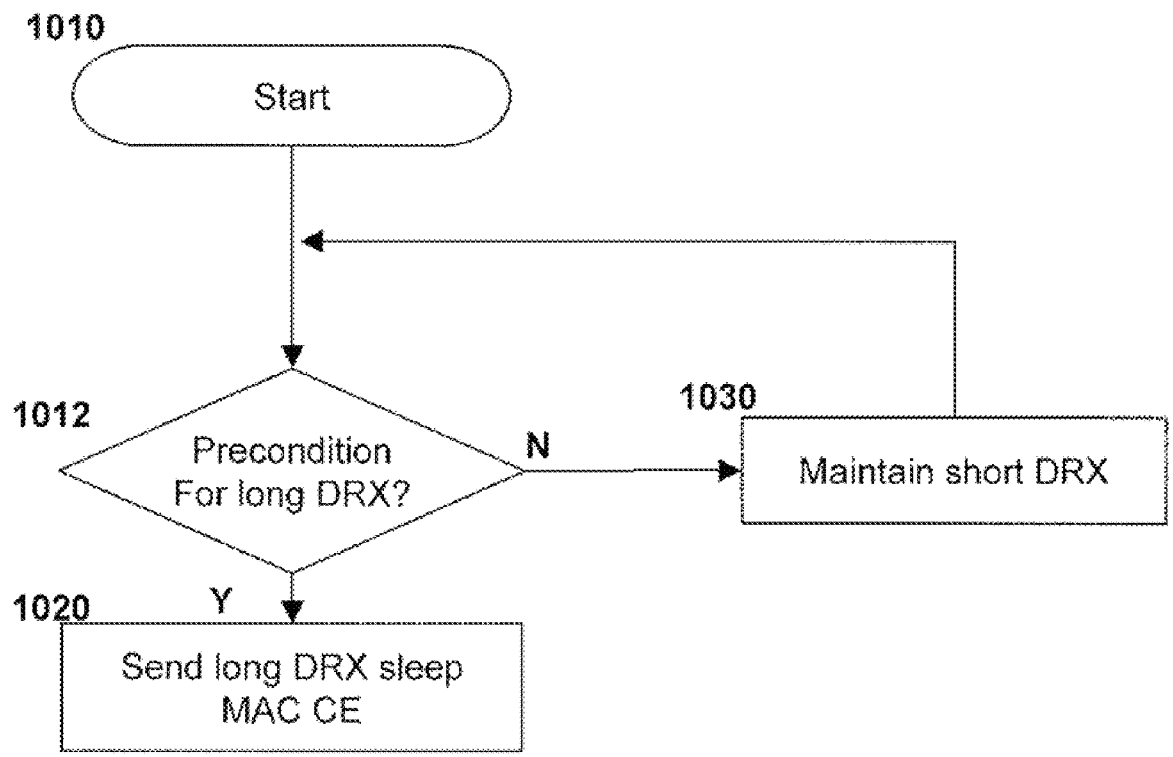
FIG. 10a is a flow chart showing a method to transition directly to long DRX period using a MAC-PDU header from the eNB side.

Reference is now made to FIG. 10a. In FIG. 10a, the process starts at step 1010 and proceeds to step 1012 in which a check is made to determine whether a precondition for long DRX exists. As will be appreciated by those skilled in the art, such a precondition could include one or more of: the DRX being configured for non real time traffic, a lack of uplink and downlink traffic for the UE, low data transmission to the UE, the position of the UE within a cell and the likelihood of a transition occurring, among others. If, in step 1012, a determination is made that the precondition exists the process proceeds to step 1020 in which a long DRX MAC CE is sent to the UE.

Conversely, if the precondition in step 1012 does not exist, the process proceeds to step 1030 in which the short DRX period is maintained and the process proceeds back to step 1012.

Figure 10B:
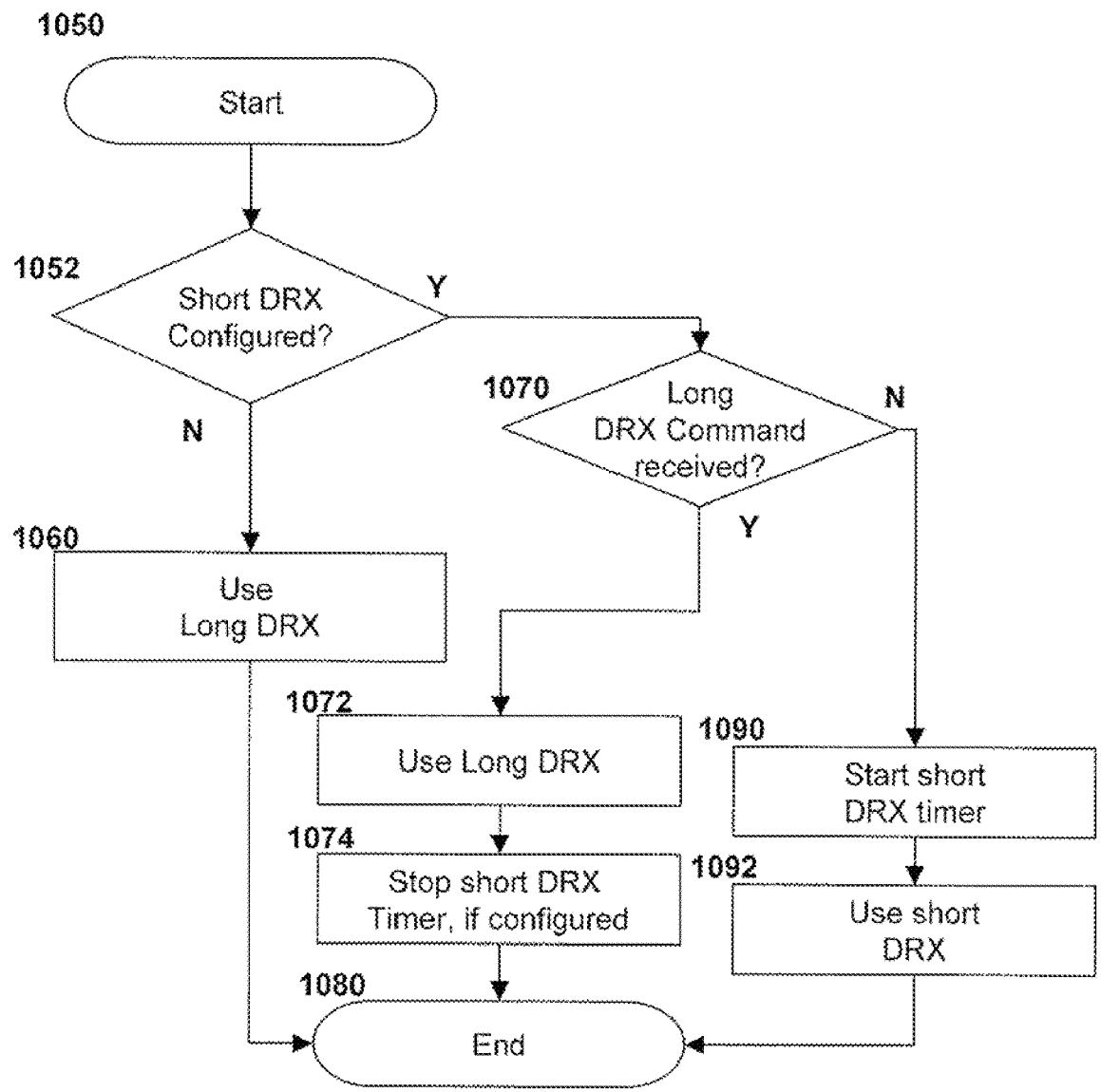
FIG. 10b is a flow chart showing a method to transition directly to a long DRX period from the UE side.

From the UE perspective, reference is now made to FIG. 10*b*. The process in FIG. 10*b* starts at step 1050 and proceeds to step 1052 in which a check is made to determine whether short DRX is configured. If not, the process proceeds to step 1060 in which long DRX is used.

Conversely, if it is determined in step 1052 that short DRX is configured, the process proceeds to step 1070 in which a check is made to determine whether a long DRX command has been received. As will be appreciated, this long DRX command will be part of a MAC command element and in one embodiment could be an explicit DRX command indicating long DRX, which is distinct from the previously configured DRX command. From step 1070, if a long DRX command has been received, the process proceeds to step 1072 in which the UE transitions to a long DRX. The process then proceeds to step 1074 in which a short DRX timer, if configured, is stopped. As will be appreciated, this avoids having a short DRX start on the expiry of the timer as a long DRX period is signaled.

From step 1074 the process proceeds to step 1080 and ends.

From step 1070, if a long DRX command has not been received the process proceeds to step 1090 in which a short DRX timer is started. The process then proceeds to step 1092 in which the UE uses a short DRX period. The use of the short DRX timer allows the UE to transition to long DRX after the timer has expired if no data is received or sent during the timer period.

From step 1092 the process proceeds to step 1080 and ends.

The above provides the network with the ability to command the UE to go directly to long DRX even when short DRX is configured. This saves battery consumption and network resources when very low traffic is observed by the eNB. The solution provides a more efficient way to transition to long DRX than by sending RRC level reconfiguration messages.

As will be appreciated by those skilled in the art, one issue with the above solutions occurs in the case of a misinterpretation of an ACK or a NACK. Specifically, the hybrid automatic repeat request (HARQ), which is a variation of the ARQ error control method, does not always properly demodulate an ACK or a NACK due to poor channel conditions. Thus, in some situations, one can be interpreted as the other. By having the DRX activation and deactivation occur in the MAC-PDU header, an ACK to NACK or NACK to ACK misinterpretation needs to be handled.

A possible solution to the above is the introduction of timer threshold values before activating or deactivating DRX.

When the UE NACKs a MAC-PDU that has DRX header information, the UE is unaware that it should adjust the DRX period. It will expect a retransmission from the eNB. If a NACK to ACK misinterpretation occurs, the eNB receives an ACK and it will not send a retransmission and will change the DRX period. The UE waits for a time to receive the retransmission. If the UE does not receive the expected retransmission, the waiting time should be limited by an upper threshold (TH-A) considering possible NACK to ACK misinterpretations. If the UE does not receive a retransmission, it should maintain its current DRX status. The eNB will expect an exchange of information with the UE at the next DRX period. If the UE does not respond, the eNB should revert to the previous DRX period and attempt to "synchronize" with the UE.

Even when a UE ACKs a MAC-PDU, the UE needs to wait for retransmission due to possible ACK to NACK misinterpretation or possible ACK to DTX misinterpretation by the eNB. The waiting time should be limited by an upper threshold (TH-B).

If the UE is missing data as indicated on the L1/L2 signaling channel, assuming the eNB will retransmit at the next earliest opportunity, the UE needs to check the L1/L2 signaling channel within a certain duration (TH-C). Based on the various threshold parameters above, the minimum time before DRX activation should therefore be greater than (max (TH-A, TH-B)+TH-C). This threshold value can be signaled either by system broadcast or RRC signaling.

Various scenarios are considered herein:

DRX activation and ACK to NACK errors:

For an ACK to NACK misinterpretation or an ACK to a discontinuous transmit (DTX) misinterpretation (i.e. the channel conditions are so poor that the ACK appears as noise to the receiver), the following occurs. The UE receives the DRX activation in the header of the MAC-PDU and sends an ACK to the eNB. The eNB receives the ACK but misinterprets it as a NACK or a DTX misinterpretation. This results in the UE activating the DRX before the eNB, which may result in the UE missing the retransmission of the MAC-PDU from the eNB.

In the situations indicated above, an ACK to NACK or DTX misinterpretation can be solved by the UE waiting for the timing margin before activation of DRX. The margin can be based on the normal time that it takes a retransmission to occur and weighted by the average number of HARQ retransmissions to the UE that may be experienced. The DRX activation may be indicated by the RRC signaling or in the MAC-PDU header extension. When the UE acknowledges the retransmission before the timing margin expires, the UE will start the DRX at the system frame time considering propagation delay and eNB processing time assuming that two consecutive misinterpretations are very unlikely.

DRX Activation and NACK to ACK Errors:

Similarly, if the UE sends a NACK for a MAC-PDU, this could be misinterpreted as an ACK by the eNB. In the case of DRX activation, the eNB activates the DRX before the UE. If the eNB maintains the CQI resource for the UE for a short period of time after activating DRX, it will detect that the UE has not activated the DRX indicated by checking the frequency of CQI report and it can signal the DRX activation by L1/L2 control signaling. If the eNB releases the CQI resource just after activating DRX and assigns it to another UE, CQI reports from the two UE may collide. The eNB could use Time Division Multiplexing or Code Division Multiplexing to avoid the collision.

In the case that the RLC is operating in acknowledged mode (AM), when a NACK to ACK misinterpretation occurs, recovery for DRX synchronization between the eNB and the UE is established via the normal RLC retransmission mechanism. This is because the RLC layer in the transmitter will determine that the PDU is lost and therefore instigate normal ARQ recovery by resending the original data not received.

In the case that the RLC is operating in unacknowledged mode (UM mode), no recovery mechanism exists. One solution is, in the HARQ, the receiver sends a channel quality indicator (CQI). In continuous reception, the channel quality indicator is repeated every 100 milliseconds, for example. Based on the CQI report, the transmitter decides and indicates a coding rate, modulation scheme, and Transport Block size. During active DRX, the eNB may expect a CQI, for example, every second. If the eNB gets this CQI at a different rate (for example 300 milliseconds) it knows that the UE is not in DRX and a correction can occur. For the deactivation DRX in a NACK to ACK misinterpretation, the UE still thinks it is in DRX while the eNB thinks it is in an active state. This can lead to missed data; however, the next MAC-PDU an indication of DRX deactivation can again occur.

Thus assuming that the CQI (channel quality indicator) reporting will be aligned to the DRX length, the eNB will know if DRX activation is completed in the UE by checking the frequency of CQI reporting. If not completed, the eNB may use L1/L2 signaling or send only a MAC-PDU header to correct the DRX activation or reconfiguration.

Another recovery method can triggered when the eNB receives a Timing Advance (TA) Request message from a UE that should be in DRX. When the UE returns power to its transceiver and, hence, emerges from the DRX state, it will often need to send control (e.g. measurement reports) and other data messages the eNB. It is important that the UE have the proper TA before sending these messages so that the UE messages do not partially overlap with messages from other UEs as they arrive at the eNB. Hence, after a DRX cycle the UE will often send a TA Request on a random access channel so that it can get the proper TA from the eNB. If the TA request arrives at a point when the UE should be in DRX, the eNB will know that the UE did not receive the last DRX activation or modification properly. The eNB can then revert to the prior DRX period for that UE and recover DRX-period synchronization.

DRX Deactivation and ACK to NACK Errors:

In the case of DRX deactivation or DRX length reconfiguration, an ACK to NACK or DTX misinterpretation leads to the UE deactivating the DRX before the eNB, which may require no special handling if the UE acknowledges the normal retransmission from the eNB and the eNB successfully received the ACK.

DRX Deactivation and NACK to ACK Errors:

In the case of DRX deactivation or DRX length reconfiguration, a NACK to ACK misinterpretation results in the eNB deactivating the DRX before the UE, which may result in the UE missing the new data transmissions. The possible solution to this is that the eNB indicates DRX deactivation on a MAC-PDU header extension of subsequent MAC-PDUs. Assumptions are that consecutive misinterpretations are very unlikely and that no DRX reconfiguration is needed when only one MAC-PDU is needed to transmit the new data which has arrived at the eNB.

DRX Automatic Incrementation

A further consideration is the incremental extension of the DRX. Rules that dictate how the DRX period can be incremented or decremented (e.g. by factors of two), in a preferred embodiment, can be signaled during the radio bearer (RB) set up. The rules are carried in the RRC RB set-up/reconfiguration or measurement control messages to the UE. In this case, if no data is received after N current DRX cycles, the eNB and the UE increase the DRX length to the next larger value automatically. This eliminates the need for signaling between the eNB and the UE to increase the DRX length and therefore saves network and battery resources.

UE Request for DRX

Since the UE terminates all protocols from layer 1 to layer 7, the UE may be able to determine if it can go into a longest DRX value after receiving some specific data packets rather than waiting for the network to increase the DRX value gradually. In this case, however, it is required that the UE have the capability of requesting DRX activation.

As will be appreciated by those in the art, the eNB is not very intelligent when considering a UE higher layer or application activities and thus would normally gradually increase the DRX. However, the UE may know that the increase does not need to be gradual in certain cases and can immediately go to a higher value.

The eNB also signals if the UE may request for DRX activation via the radio resource control radio bearer set-up or a reconfiguration message. However, if the UE needs to inform the eNB of the possibility of a rapid change, the user plane data is not always available to piggyback a request for DRX from the UE. In a preferred embodiment, L1/L2 signaling messages are used. The UE sends a DRX request message to the eNB and the eNB replies with a DRX grant message.

Various considerations may be taken into account by the UE besides the application data flow characteristics in determining the proper DRX period. The mobility and location within the cell, for example, may be taken into account. If the UE is highly mobile or if it sees good neighboring cells, the UE may choose to request a shorter DRX period to prepare for a possible handover.

The eNB may also grant a shorter value than requested when it knows that the UE is in a high-mobility state or the UE has already missed handover opportunities, as described below. The eNB can also consider how close the UE is to the cell's edge. If the UE is close to a cell's edge, the eNB can reject or indicate a shorter time value for the DRX.

If it is allowed by the eNB, the UE indicates a proposed value for a DRX period in the optional field of uplink scheduling requests. Even if the UE already has the uplink resources, the message is used without the actual resource request part for the DRX indication.

On the eNB, the eNB responds to the requests by indicating an allowed value for the DRX. The activation time is also indicated if the request for DRX is granted.

In some embodiments, the DRX request can be integrated in the UL scheduling request and DRX grant can be integrated in the UL scheduling grant.

The UE also considers its mobility and the likelihood of handover when requesting DRX values, which can be based on the channel quality measurement of the serving cell and its neighboring cells. The UE may also increase measurement frequencies independently to detect handover conditions more accurately, as described below. The UE may consider its mobility status, whether high or low, which may be based on positioning measurements, an accelerometer or the filtering of L1 data.

Figure 4A:
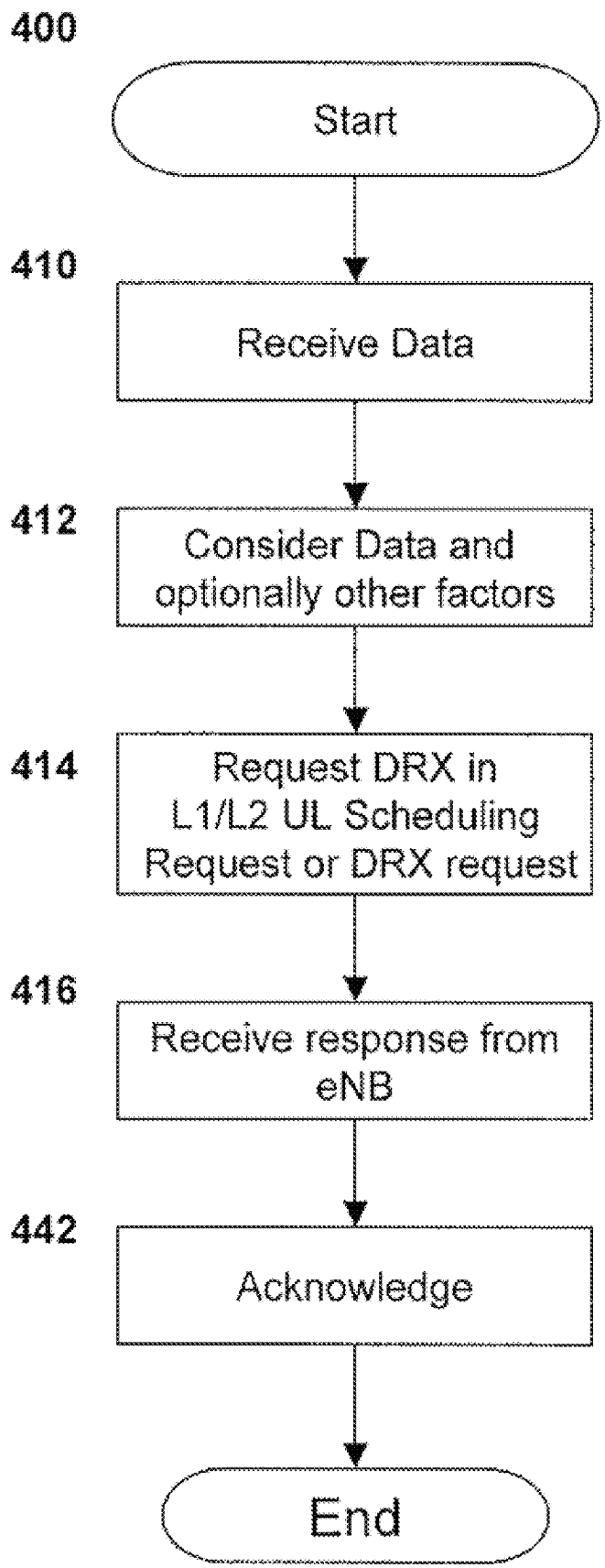
FIG. 4a is a flow chart showing a method for a UE to leverage application traffic characteristics to improve battery life from the UE side.

Reference is now made to FIG. 4a. The process of FIG. 4 starts at step 400 and proceeds to step 410 in which the UE receives data.

The process then proceeds to step 412 in which the UE considers the data and optionally considers other factors as described above. Specifically, the UE may consider the mobility of the UE or the signal strength of neighboring cells.

Based on the considerations of step 412, the process proceeds to step 414 in which it requests a DRX in the L1/L2 uplink scheduling request.

Reference is now made to FIG. 4b. The process then proceeds to step 416 in which the eNB receives the request.

The eNB, in step 418 considers the request and other optional factors as described above. Specifically, the eNB may consider whether the UE has missed a cell handover opportunity before or is close to a cell boundary, or is highly mobile. In step 420 the eNB decides whether to allow the request of step 414 based on the factors in step 418. If yes, the process proceeds to step 430 in which it signals that the request has been accepted. If no, the process proceeds from step 420 to step 440 in which the eNB can either reject the request completely or can suggest a shorter duration for the DRX. Referring to FIG. 4a, the UE receives the response from the eNB in step 442, and may acknowledge in step 444.

As will be appreciated by those skilled in the art, a long DRX may lead to inaccurate handover decisions and executions by the UE. When activating the DRX, the receiver will have less measurement opportunity and thus the accuracy of the channel condition estimation is degraded. Due to the measurement accuracy degradation caused by DRX, the UE may miss a handover opportunity.

Based on the above, the eNB can reject the request or grant a shortened DRX value if it knows that the UE is located close to a cell edge. This decision can be based on the current timing adjustment value assuming its available, the UE mobility status, whether high or low, the number of handovers within a certain period considering cell radius or the number of occasions that the UE goes out of the serving cell or indeed knowledge regarding the actual size of the cell (e.g. macro, micro or pico). These are all factors that can be considered in step 418 of FIG. 4b.

Measurement Accuracy

A third factor for DRX in the LTE-ACTIVE state is the possibility of missed handover opportunities. Since the UE receiver is turned off during the DRX period, the measurement quality of serving and neighboring cells is likely degraded compared to a continuous measurement. This degradation may lead to premature handover or missed handover opportunities, which should be avoided to the maximum extent possible.

In order to reduce the number of premature handovers or missed handover opportunities in DRX, in a preferred embodiment the UE is allowed to have a shorter measurement cycle than the DRX cycle when necessary. For example, if the channel quality of the serving cell is lower than a threshold value A, the UE may start continuous measurements or shorter measurement cycles to prepare for a possible handover condition. If it turns out to be a false alarm, i.e. if the channel quality obtained by the continuous measurement is greater than a threshold value B, the UE can go back to the measurement cycle equal to the DRX cycle. As will be appreciated by those skilled in the art, the two threshold values represent better channel conditions than a value that triggers handover so that a sufficient level of accuracy is obtained when required to evaluate handover conditions, thus missed handover opportunities can be reduced.

In one embodiment of the present disclosure, the measurement interval may be configured to be equal to a DRX interval divided by N where N is an integer. This would be in the situation where the mobile may be expecting a handover and/or there is high mobility.

The network can configure the thresholds and the shorter measurement cycles, and this can be signaled to the UE via broadcast information or an RRC measurement control message. The MAC-PDU header can indicate to the network the shortened DRX cycle value once the UE has shortened the measurement cycle.

An example of the above is when there is an RRC connection or a radio bearer is established. In this case, the eNB can indicate the two channel quality values to which shorter DRX is started and stopped respectively, and the ratio between measurement and DRX cycles.

On the UE, the UE acts on the RRC signaling and starts or stops the shorter measurement cycles according to the measurement of channel quality compared to the threshold values.

Reference is made to FIG. 5. FIG. 5 illustrates various zones where the UE may be situated including threshold values to indicate the DRX cycle. In the first zone 510, the DRX cycle equals the measurement cycle. The UE stays within this zone until it reaches a threshold 520 in which it needs to start a shorter measurement cycle.

The UE stays with the shorter measurement cycle until either the signal degrades to indicate a handover condition 530 or if the signal improves until it achieves an upper threshold 540, at which point the DRX cycle and measurement cycle equal each other.

Preferably the eNB signals the following information in the radio bearer set-up or in a measurement control message:

A higher threshold value used to lengthen the DRX cycle. This higher threshold value indicates higher channel quality and/or signal strength;

A lower threshold value used to shorten the DRX cycle. The lower threshold value indicates lower channel quality and/or signal strength;

Time-to-trigger associated with the higher threshold value and the lower threshold value; and The handover condition, such as the "best cell changed" and the measurement cycle equals zero, indicating continuous measurement.

The diagram of FIG. 7 shows an example in which the channel quality or signal power (as indicated in measurement reports) goes below the lower threshold value (LTV) and then goes above the higher threshold value (HTV) without uplink data. In this case, the shortened measurement period is implemented between A and B, whereas the DRX cycle equals the measurement cycle before A and after B.

Figure 8:
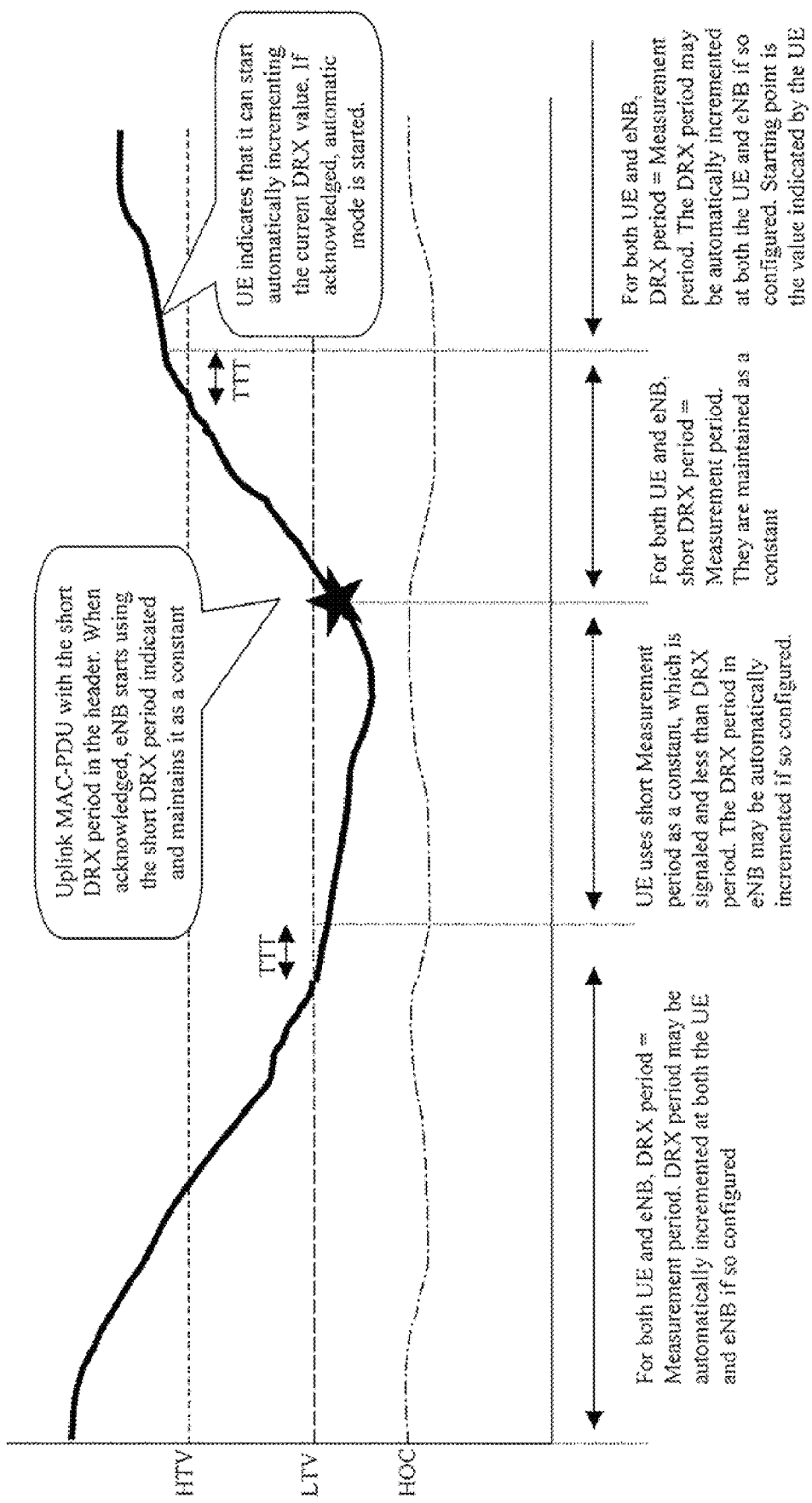
FIG. 8 is a graph showing channel status going below a lower threshold value and then above a higher threshold value with uplink data.

FIG. 8 shows an example in which the channel quality or signal power (as indicated in measurement reports) goes below the lower threshold value (LTV) and then goes above the higher threshold value (HTV) with uplink (UL) data. In this case, the UE goes to a short measurement cycle if the channel quality is below the lower threshold value more than a certain duration (time to trigger). If there is uplink data, the UE starts an initial UL access procedure to obtain a UL resource grant by sending the scheduling request. The scheduling request or the header of the uplink MAC-PDU could indicate a request for a shorter DRX period. The eNB responds to the request by sending scheduling grant message with a preferred DRX value or the eNB could indicate a preferred DRX value in the next downlink MAC-PDU. When the scheduling grant is received or the downlink MAC-PDU is acknowledged, the eNB can start using the new DRX value. The figure then shows the channel quality or signal power (as indicated in measurement reports) goes above a higher threshold value for a certain duration (time to trigger). The UE indicates a request for a longer DRX value in the scheduling request or in the header of the MAC-PDU if UL data is available. The eNB responds to the request by sending a scheduling grant message with a preferred DRX value and an indication to start the automatic mode or the eNB could indicate a preferred DRX value with an indication to start the automatic mode in the header of the next downlink MAC-PDU. When the scheduling grant is received or the downlink MAC-PDU is acknowledged, automatic mode is started with the initial DRX value specified by the eNB. If no data is available then the UE needs to send a L1/L2 control message to request the automatic increment of DRX.

Figure 9:
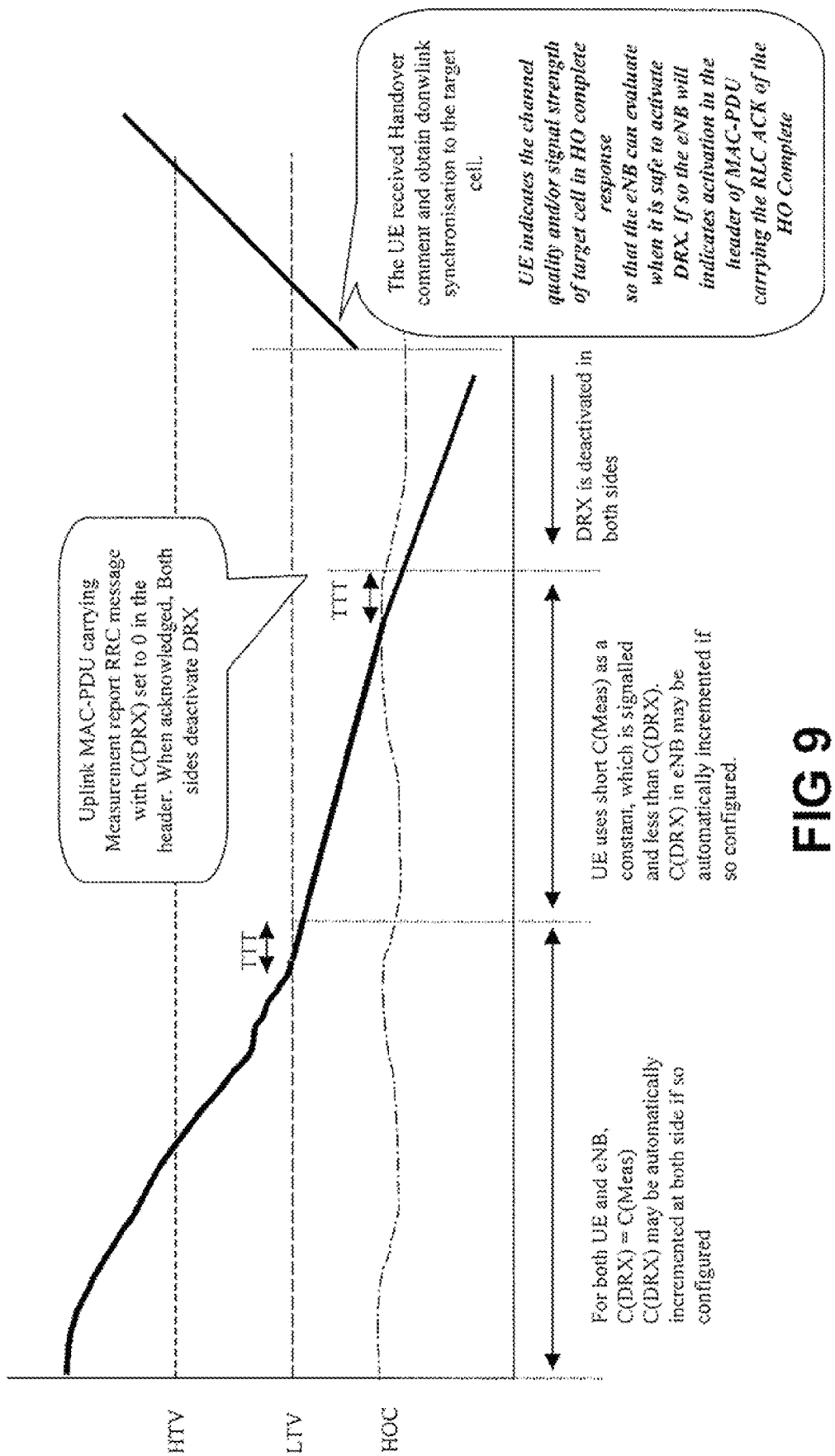
FIG. 9 is a graph showing signal degradation in which a handover condition is triggered.

The example of FIG. 9 shows a handover condition trigger. In this case, the signal is gradually degrading until it proceeds below a lower threshold value for a certain time to trigger, at which point, the UE starts using a shorter measurement. The UE then sees the handover condition for a certain duration (time to trigger). At this moment the UE initiates the UL access procedure and transmits a scheduling request in order to obtain UL resources for the measurement report message. DRX value of zero or a request for going back to continuous reception mode can be indicated in the scheduling request or in the MAC-PDU carrying the measurement report message. The eNB responds to the request by sending scheduling grant message with the preferred DRX value of zero or the eNB could indicate a preferred DRX value of zero in the next downlink MAC-PDU. When the scheduling grant is received or the downlink MAC-PDU is acknowledged, both sides deactivate DRX. On handover, the UE receives a handover command and obtains downlink synchronization to the target cell. The UE then indicates the channel quality and/or signal strength of the target cell in the handover complete response. The eNB can then evaluate when it is safe to activate DRX. If so the eNB indicates DRX activation in the downlink (DL) MAC-PDU header or L1/L2 control signaling.

In the above paragraphs, the requests made by the UE for a shorter or longer DRX period or the DRX value itself are in the scheduling request or the header of the uplink MAC header. The eNB responds to the UE, by specifying the preferred DRX period with an indication if an automatic DRX increase/decrease rule can be applied, within the scheduling grant or downlink MAC-PDU header.

In another embodiment, the scheduling request indicates the cause of uplink access. For example, suppose that during a DRX period of 2.56 seconds a VOIP call is originated. In order for the network to respond the VOIP call setup promptly, the UE sends the scheduling request with a cause of uplink access, e.g. call setup. The eNB replies to the request by sending a scheduling grant indicating a DRX value of zero (the preferred DRX value).

Detection and Handling of Very Late Handover

In order to utilize the DRX in the LTE_ACTIVE state, a standardized criterion for the UE to determine if a handover opportunity is missed is preferable. If such a condition is satisfied, the UE should establish a connection to a neighboring cell rather than the serving cell. As will be appreciated by those skilled in the art, in the LTE infrastructure, only network based handover procedures apply and there are no UE based procedures such as cell reselection as used in UMTS.

If, in a preferred embodiment, the channel quality of the serving cell is less than a neighboring cell by a threshold value C for a certain time duration T, the UE is required to connect itself to the neighboring cell on the target eNB. The value C and T can be signaled by system broadcast information or RRC signaling.

The process for switching to the target eNB includes the steps of:
1. Start UL initial access procedure to obtain a timing advance value for the target cell and uplink resources for the subsequent control messages;
2. Transmit a reconnect request to the target eNB with the current RNTI (radio network temporary identifier) and previous cell ID;
3. The target eNB contacts the serving eNB in order to obtain the UE context and downlink data needs to be transferred. The target eNB also connects itself to the access gateway and removes the serving eNB from the aGW; and
4. The target eNB transmits a reconnect response to the UE with a new RNTI and uplink grant.

An optional component includes a status message to be carried over the reconnect request and response so that the amount of data transferred between the target and serving eNB and between the target and serving eNB and the air interface with the UE can be minimized.

Optimizations include the reconnect request in step 2 above to be sent with a status report showing the PDCP (packet data convergence protocol) SDU (service data unit) sequence numbers which the UE has received successfully. This information helps to reduce the amount of downlink user data to be transferred from the serving to the target eNB and over the air to the UE. Since the RLC is likely reset in the procedure, PDCP SDU sequence numbers need to be used.

Likewise, the reconnect response can be sent with a status report showing PDCP SDU sequence numbers which the serving eNB receives successfully so that the UE can retransmit data that was missed.

Further, if the target eNB finds that there is no data to be transferred from the serving eNB and from the aGW, the reconnect response indicates DRX activation.

Figure 6A:
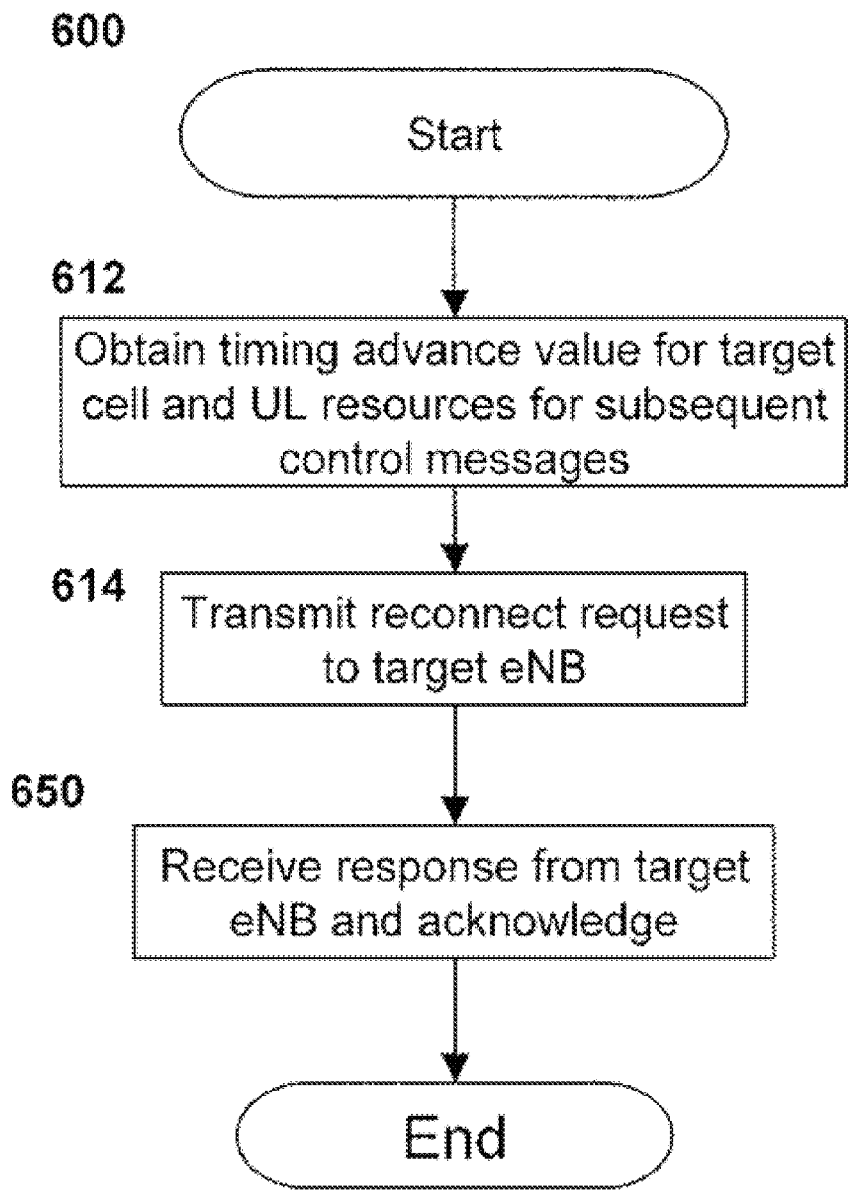
FIG. 6a is a flow chart illustrating procedural steps involved in switching to a target eNB from the UE side.

The above is illustrated in FIG. 6a in which, in step 612, the UE obtains a timing advance value for the target cell and uplink resources for the subsequent control messages. The process then proceeds to step 614 in which the UE transmits a reconnect request to the target eNB with the current RNTI and cell ID. The UE then waits for and acknowledges a response from the target eNB in step 650.

Figure 6B:
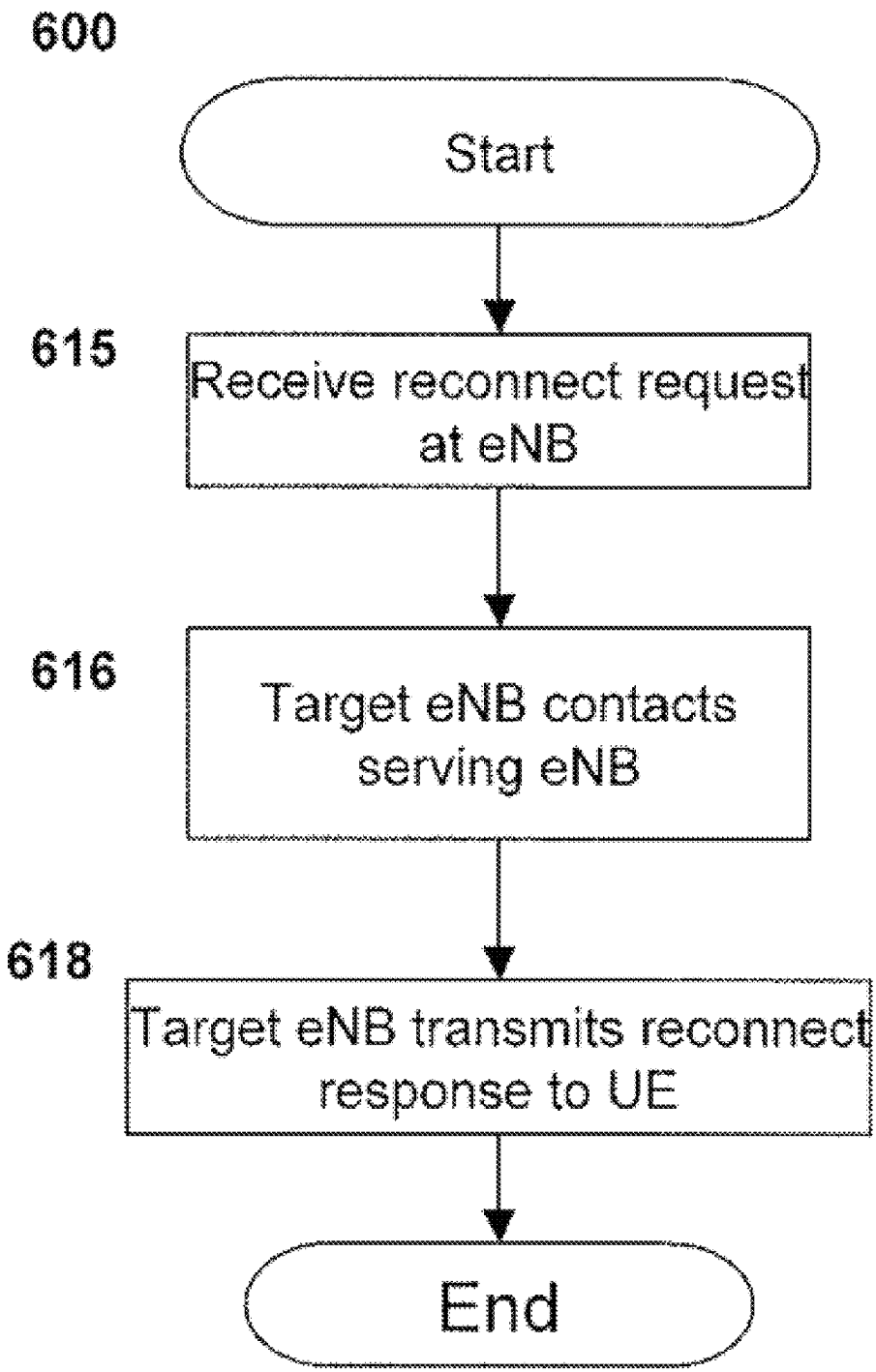
FIG. 6b is a flow chart illustrating procedural steps involved in switching to a target eNB from the eNB side.

Referring to FIG. 6b, the target eNB receives the request at step 615 and then proceeds to step 616 in which the target eNB contacts the serving eNB in order to obtain the UE context.

In step 618, the target eNB transmits a reconnect response to the UE with the new RNTI and uplink grant.

The above can be implemented on any UE. Such UEs include, but are not limited to, personal digital assistants, cellular telephones, wireless data devices, among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for configuring a discontinuous reception 'DRX' period at a user equipment comprising:
   determining whether a short DRX period is configured at the user equipment;
   when no short DRX period is configured, setting a long DRX period;
   when the short DRX period is configured, determining whether a long DRX command was received in a medium access control 'MAC' control element;
   when a long DRX command is received in the MAC control element, setting a long DRX period and delaying activation of the long DRX period in accordance with a timing margin configured to synchronize the user equipment DRX configuration with an evolved node B 'eNB';

when a long DRX command is not received in the MAC control element, starting a short DRX timer and setting a short DRX period.

2. The method of claim 1, wherein the user equipment maintains a short DRX configuration.

3. The method of claim 1, wherein the DRX is configured for non real time traffic.

4. The method of claim 1, further comprising the step of stopping a short DRX timer if the long DRX command in the MAC control element was received.

5. A user equipment adapted to configure a discontinuous reception 'DRX' period, comprising:
   a communications subsystem, said communications subsystem adapted to receive a medium access control 'MAC' control element;
   a memory, said memory adapted to store information for the medium access control element; and
   a processor, said processor adapted to:
      determine whether a short DRX period is configured at the user equipment;
      when no short DRX period is configured, set a long DRX period;
      when the short DRX period is configured, determine whether a long DRX command was received in the medium access control 'MAC' control element;
      when a long DRX command is received in the MAC control element, set a long DRX period and delay activation of the long DRX period in accordance with a timing margin configured to synchronize the user equipment DRX configuration with an evolved node B 'eNB';
      when a long DRX command is not received in the MAC control element, start a short DRX timer and set a short DRX period.

6. The user equipment of claim 5, wherein the memory is adapted to maintain a short DRX configuration.

7. The user equipment of claim 5, wherein the DRX is configured for non real time traffic.

8. The user equipment of claim 5, wherein the processor is further adapted to stop a short DRX timer if the long DRX command in the MAC control element was received.

9. The method of claim 1, wherein timing margin is derived from a header of the MAC control element.

10. The method of claim 1, wherein the DRX configuration comprises DRX activation and DRX deactivation.

11. The method of claim 1, further comprising:
   determining, by the user equipment, the timing margin.

12. The user equipment of claim 5, wherein timing margin is derived from a header of the MAC control element.

13. The user equipment of claim 5, wherein the DRX configuration comprises DRX activation and DRX deactivation.

14. The user equipment of claim 5, wherein the processor is further configured to determining the timing margin.

* * * * *